United States Patent
Kataoka et al.

(10) Patent No.: US 10,717,356 B2
(45) Date of Patent: Jul. 21, 2020

(54) HIGH PRESSURE CANISTER UNIT AND FUEL CELL VEHICLE

(71) Applicant: TOYOTA JIDOSHA KABUSHIKI KAISHA, Toyota-shi, Aichi-ken (JP)

(72) Inventors: Chiaki Kataoka, Nagakute (JP); Shinsuke Kinoshita, Toyota (JP); Osamu Sawai, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/047,604

(22) Filed: Jul. 27, 2018

(65) Prior Publication Data
US 2019/0047411 A1 Feb. 14, 2019

(30) Foreign Application Priority Data

Aug. 9, 2017 (JP) ................................. 2017-154296
Apr. 25, 2018 (JP) ................................. 2018-084247

(51) Int. Cl.
*B60K 15/07* (2006.01)
*B60K 15/03* (2006.01)
(Continued)

(52) U.S. Cl.
CPC ........ *B60K 15/07* (2013.01); *B60K 15/03006* (2013.01); *F17C 13/084* (2013.01);
(Continued)

(58) Field of Classification Search
CPC .............. B60K 15/07; B60K 15/03006; B60K 2015/0634; B60K 2015/03315;
(Continued)

(56) References Cited

U.S. PATENT DOCUMENTS 4,522,159 A  *  6/1985  Engel ............... B60K 15/03006
                                              123/1 A
5,658,013 A       8/1997  Bees et al.
                          (Continued)

FOREIGN PATENT DOCUMENTS

CA       2421615 A1    3/2002
FR       867.735 A     11/1941
                   (Continued)

OTHER PUBLICATIONS

Jan. 16, 2019 Extended Search Report issued in European Patent Application No. 18187756.4.

*Primary Examiner* — Jacob B Meyer
(74) *Attorney, Agent, or Firm* — Oliff PLC

(57) ABSTRACT

A high pressure canister unit includes: plural arrayed canister bodies, each canister body being formed in a circular cylinder shape, and including an opening at at least one end portion in its axial direction; a coupling member that is connected to the opening of each of the canister bodies and that couples the plural canister bodies together, and the coupling member including a flow path placing interiors of the canister bodies in communication with each other; a box-shaped case that is configured to house the plural canister bodies and the coupling member, the case including a through hole; and a leader tube that is provided to the coupling member, that leads out to an exterior of the case through the through hole of the case, and to which a valve capable of opening and closing the flow path is attached.

10 Claims, 11 Drawing Sheets

(51) Int. Cl.
*F17C 13/08* (2006.01)
*B60K 15/063* (2006.01)
*F17C 1/02* (2006.01)

(52) U.S. Cl.
CPC ............... *B60K 2015/03315* (2013.01); *B60K 2015/0634* (2013.01); *F17C 1/02* (2013.01); *F17C 2201/0109* (2013.01); *F17C 2205/0111* (2013.01); *F17C 2205/0142* (2013.01); *F17C 2270/0184* (2013.01)

(58) Field of Classification Search
CPC ............ F17C 13/084; F17C 2270/0184; F17C 2205/0142; F17C 2205/0111; F17C 2201/0109; F17C 1/02
See application file for complete search history.

(56) References Cited

U.S. PATENT DOCUMENTS

| | | | | |
|---|---|---|---|---|
| 6,257,360 | B1 * | 7/2001 | Wozniak | B60K 15/013 180/69.5 |
| 6,676,159 | B1 * | 1/2004 | Sellergren | B60K 15/03006 206/0.7 |
| 6,708,719 | B2 * | 3/2004 | Idoguchi | F17C 1/00 137/266 |
| 7,237,644 | B2 * | 7/2007 | Matsumoto | B60K 13/04 180/309 |
| 7,337,794 | B2 * | 3/2008 | Brigham | F17D 1/04 137/1 |
| 7,624,753 | B2 * | 12/2009 | Suess | B60K 15/03006 137/259 |
| 8,216,737 | B2 * | 7/2012 | Sommer | H01M 8/247 429/408 |
| 8,381,850 | B2 * | 2/2013 | Asai | B60K 1/00 180/291 |
| 9,056,631 | B2 * | 6/2015 | Nakamori | B60K 1/04 |
| 9,689,532 | B2 * | 6/2017 | Barbato | F17C 5/06 |
| 9,878,611 | B1 * | 1/2018 | Abd Elhamid | B60K 15/03006 |
| 10,421,355 | B2 * | 9/2019 | Kataoka | B60K 15/07 |
| 2003/0146214 | A1 | 8/2003 | Idoguchi | |
| 2003/0178422 | A1 * | 9/2003 | Kosuge | B60K 15/03006 220/4.14 |
| 2004/0026427 | A1 * | 2/2004 | Shigematsu | B60K 15/03006 220/562 |
| 2005/0161267 | A1 * | 7/2005 | Elson | B60K 15/063 180/65.1 |
| 2005/0169724 | A1 * | 8/2005 | Sharp | B60K 15/07 410/42 |
| 2006/0032532 | A1 * | 2/2006 | Suess | B60K 15/03006 137/266 |
| 2006/0033322 | A1 * | 2/2006 | Suess | B60K 15/03006 280/830 |
| 2006/0113131 | A1 * | 6/2006 | Kato | B60K 1/04 429/434 |
| 2007/0007060 | A1 * | 1/2007 | Ono | B60K 1/04 180/65.31 |
| 2009/0272590 | A1 * | 11/2009 | Kim | B60K 15/03006 180/69.5 |
| 2011/0140483 | A1 * | 6/2011 | Veenstra | B60K 15/07 296/210 |
| 2012/0223113 | A1 * | 9/2012 | Gaisne | H01M 2/1083 224/538 |
| 2014/0375043 | A1 * | 12/2014 | Finck | B60K 15/063 280/831 |
| 2015/0244035 | A1 * | 8/2015 | Yokoyama | H01M 2/1077 429/71 |
| 2016/0023548 | A1 * | 1/2016 | Crist | B60K 15/03006 180/271 |
| 2017/0182883 | A1 * | 6/2017 | Matijevich | B60K 15/07 |
| 2017/0282709 | A1 * | 10/2017 | Sasaki | B60K 15/03006 |
| 2017/0299769 | A1 * | 10/2017 | Ohmi | B60K 15/063 |
| 2019/0031044 | A1 * | 1/2019 | Paulsen | B21C 23/142 |
| 2019/0047404 | A1 * | 2/2019 | Sawai | B60K 15/03 |
| 2019/0047407 | A1 * | 2/2019 | Kataoka | B60K 15/03519 |
| 2019/0047409 | A1 * | 2/2019 | Kataoka | B60K 15/067 |
| 2019/0047410 | A1 * | 2/2019 | Kataoka | B60K 15/03006 |
| 2019/0047411 | A1 * | 2/2019 | Kataoka | F17C 13/084 |
| 2019/0047633 | A1 * | 2/2019 | Sawai | B60K 15/03006 |
| 2019/0100090 | A1 * | 4/2019 | Matecki | B60K 1/04 |
| 2019/0263450 | A1 * | 8/2019 | Inoue | B62D 21/152 |
| 2019/0381899 | A1 * | 12/2019 | Gunther | B60K 1/04 |

FOREIGN PATENT DOCUMENTS

| | | |
|---|---|---|
| JP | 2000-514011 A | 10/2000 |
| JP | 2001239846 A * | 9/2001 |
| JP | 2008-049961 A | 3/2008 |
| JP | 2009-270707 A | 11/2009 |
| JP | 2014-185713 A | 10/2014 |
| JP | 2018-112201 A | 7/2018 |
| KR | 100536964 B1 | 12/2005 |
| KR | 100863643 B1 | 10/2008 |
| KR | 101281249 B1 | 7/2013 |

* cited by examiner

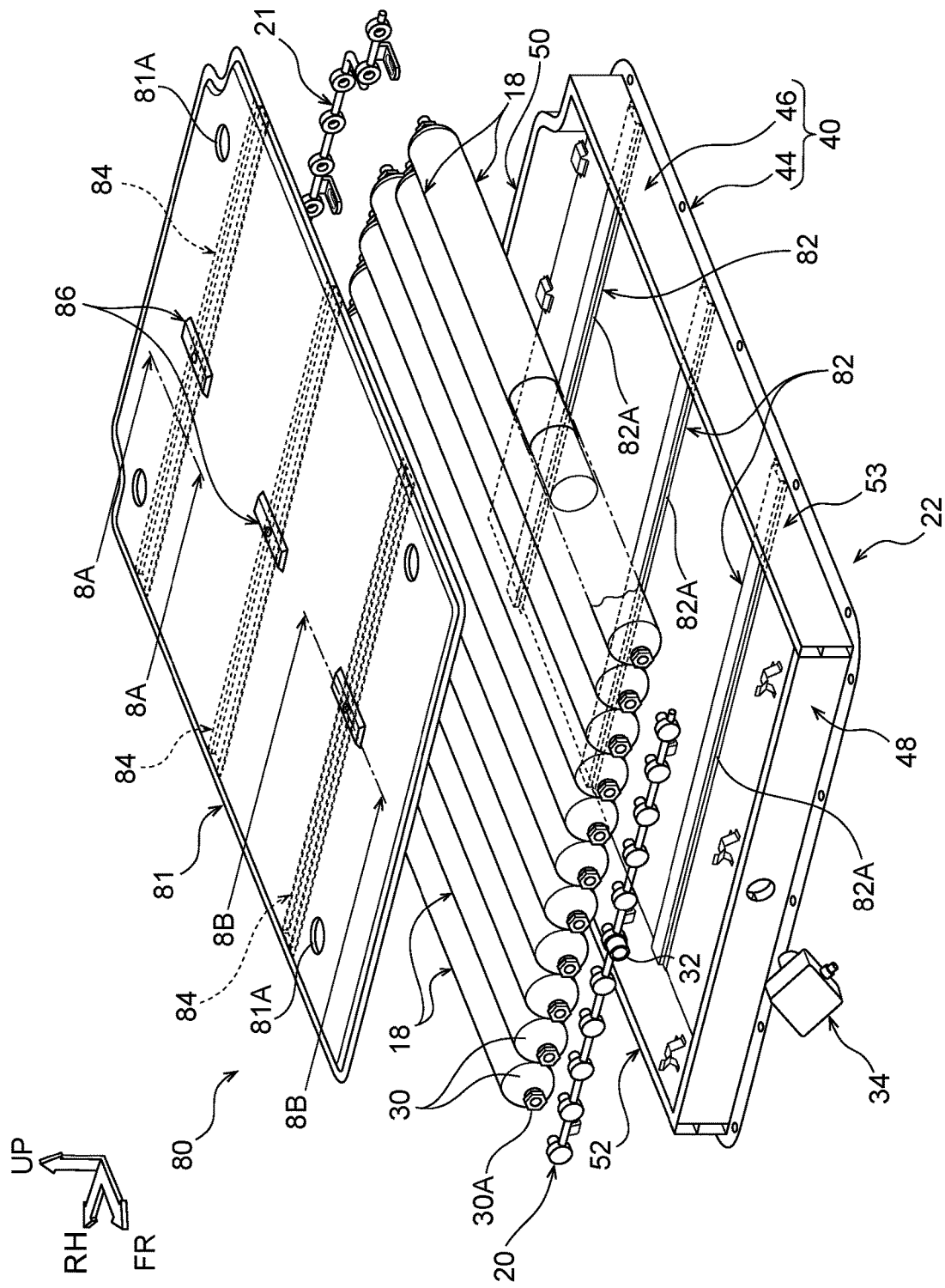

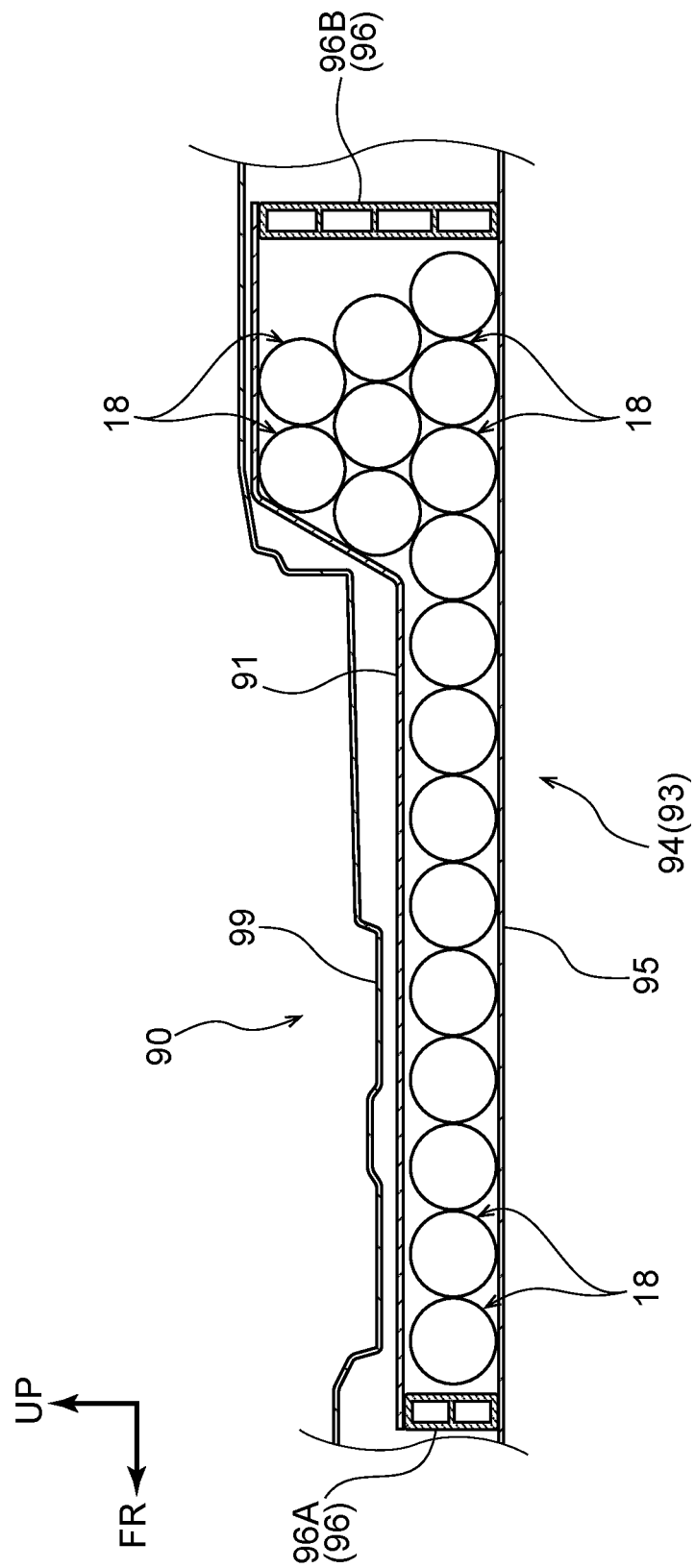

HIGH PRESSURE CANISTER UNIT AND FUEL CELL VEHICLE

CROSS-REFERENCE TO RELATED APPLICATIONS

This application is based on and claims priority under 35 USC 119 from Japanese Patent Applications No. 2017-154296 filed on Aug. 9, 2017, and No. 2018-084247 filed on Apr. 25, 2018, the disclosures of which are incorporated by reference herein.

BACKGROUND

Technical Field

The present disclosure relates to a high pressure canister unit and a fuel cell vehicle.

Related Art

Japanese Patent Application Laid-Open (JP-A) No. 2008-49961 discloses a structure in which plural canister bodies (high pressure tanks) are housed in an open-topped case. In this technology, valves are attached to each canister body, and the valves are coupled together by a tube, for example a feed tube or a refill tube. Moreover, JP-A No. 2009-270707 discloses a structure in which plural barrel-shaped hydrogen tanks of different diameters are housed in a case with a handle, and the case is installed above a rear floor.

The case disclosed in JP-A No. 2009-270707 is a simple case for carrying hydrogen tanks, and therefore leaves room for improvement with regard to securing shock resistance when mounted in a vehicle. As a response strategy, a method such as that of JP-A No. 2008-49961, in which plural canister bodies are housed in a box shaped case, may be considered. However, since valves are provided to each of the canister bodies and the valves are coupled together by a tube, the structure becomes more complex when the number of canister bodies is increased in order to increase capacity.

SUMMARY

In consideration of the above circumstances, the present disclosure provides a vehicle and a high pressure canister unit capable of achieving high capacity with a simple structure, while ensuring shock resistance.

A first aspect of the present disclosure is a high pressure canister unit including plural arrayed canister bodies, each canister body being formed in a circular cylinder shape, and including an opening at at least one end portion in its axial direction; a coupling member that is connected to the opening of each of the canister bodies and that couples the plural canister bodies together, and the coupling member including a flow path placing interiors of the canister bodies in communication with each other; a box-shaped case that is configured to house the plural canister bodies and the coupling member, the case including a through hole; and a leader tube that is provided to the coupling member, that leads out to an exterior of the case through the through hole of the case, and to which a valve capable of opening and closing the flow path is attached.

In the high pressure canister unit of the first aspect, plural of the circular cylinder shaped canister bodies are arrayed. The openings are provided at at least one axial direction end portion of each of the canister bodies, and the openings are coupled together by the coupling member. The interiors of the plural canister bodies are placed in communication with each other through the coupling member. The leader tube is provided to the coupling member, and the valve is attached to the leader tube. This thereby enables fuel to be filled, and fuel to be fed out, by opening and closing the valve alone, even when the number of the canister bodies is increased in order to increase capacity. Namely, the plural canister bodies configure a unit capable of functioning as a single high pressure canister, enabling capacity to be increased with a simple structure.

The plural canister bodies and the coupling member are housed in the box shaped case, and the leader tube provided to the coupling member leads out to the exterior of the case through the through hole. Housing the plural canister bodies in the case in this manner enables the canister bodies and the coupling member to be protected, enabling shock resistance to be secured. Note that here, "box shaped" encompasses shapes that include a bottom wall that supports the objects housed therein and a peripheral wall surrounding the objects housed therein, and encompasses shapes that are not covered.

In this manner, the high pressure canister unit of the first aspect enables capacity to be increased with a simple structure, while securing shock resistance.

In the first aspect, the leader tube may be provided at an intermediate portion of the coupling member in an array direction of the canister bodies.

In the above configuration, when filling the plural canister bodies with fuel, the fuel flows into the coupling member through the leader tube provided at the intermediate portion of the coupling member in the array direction of the canister bodies. This thereby enables the respective canister bodies to be suppressed from being filled with uneven amounts of fuel in comparison to structures in which a leader tube is provided at one end portion of a coupling member. Conversely, when the fuel with which the canister bodies have been filled is being fed to the exterior, an approximately equal amount of fuel may be fed from each of the canister bodies. This thereby enables variation in the temperature of the respective canister bodies in the case as a result of pressure changes in the canister bodies to be suppressed.

In this manner, the high pressure canister unit configured may suppress variation in the temperature of the respective canister bodies in the case as a result of pressure changes in the canister bodies.

In the first aspect, the case may include a case body including a bottom wall and a frame-shaped peripheral wall projecting upward from the bottom wall and surrounding the plural canister bodies, and a cover member. Moreover, the peripheral wall of the case body has a closed cross-section structure.

In the above configuration, the case includes the case body and the cover member, thereby enabling foreign objects and the like to be suppressed from entering the case body. Moreover, since the peripheral wall of the case body has a closed cross-section structure, deformation of the peripheral wall may be better suppressed than in structures in which the peripheral wall is formed from a member with an open cross-section. This enables the input of shock to the canister bodies inside the case to be reduced as a result.

In this manner, the high pressure canister unit configured as described above is capable of suppressing the intrusion of foreign objects into the case, and is also capable of enhancing the shock resistance of the case.

The first aspect may further include an attachment bracket provided to the bottom wall, and the canister bodies may be disposed via the attachment bracket such that the canister bodies do not contact the bottom wall.

In the above configuration, the canister bodies are in a state not contacting the bottom wall. This thereby enables direct input of shock to the canister bodies from the bottom wall to be suppressed if, for example, the case comes into contact with a road surface while a fuel cell vehicle mounted with the high pressure canister unit is traveling. Moreover, noise caused by contact between the bottom wall and the canister bodies may be suppressed.

In this manner, the high pressure canister unit configured as described above is capable of enhancing shock resistance, and is also capable of suppressing the occurrence of noise.

The first aspect may further include a load transmission section having a closed cross-section structure, the load transmission section may be disposed at at least one of the bottom wall or the cover member, and may span between two opposing walls of the peripheral wall In the above configuration, in a case in which a load is input to the case, this load is able to be transmitted toward the opposite side of the case via the load transmission section.

In this manner, the load bearing property of the high pressure canister unit may be enhanced.

In the first aspect, the load transmission section may be disposed at a canister body side of the cover member, an air passage may be formed between the cover member and the load transmission section, and the air passage may include a vent that allows a gas to be released to an exterior of the case.

In the above configuration, the air passage is provided at the cover member between the cover member and the load transmission section, and the vent is formed at the air passage. This may prevent a gas in the case from remaining inside the case due to being obstructed by the load transmission section.

In this manner, the high pressure canister unit configured as described above may effectively release a gas inside the case to the exterior.

A second aspect of the present disclosure is a fuel cell vehicle including the high pressure canister unit of the first aspect, and the high pressure canister unit may be disposed at a vehicle lower side of a floor panel configuring a floor surface of a vehicle cabin.

In the second aspect, the high pressure canister unit is disposed at the vehicle lower side of the floor panel, thereby enabling placement space for the high pressure canister unit to be secured without reducing the size of the cabin space or a luggage space.

In this manner, the fuel cell vehicle of the second aspect is capable of suppressing a reduction in cabin space and luggage space.

In the second aspect, the canister bodies may be arrayed in a vehicle width direction while the axis direction of the canister bodies is along a vehicle front-rear direction.

In the above configuration, the coupling members coupling the canister bodies are disposed at the vehicle front side or the vehicle rear side. Fuel supply to the FC stack disposed at the vehicle front or rear section may be thereby performed smoothly.

In this manner, the high pressure canister unit configured as described above may smoothly supply fuel to the FC stack.

In the second aspect, the canister bodies may be arrayed in a vehicle front-rear direction while the axis direction of the canister bodies is along a vehicle width direction.

In the above configuration, since the axis direction of the canister bodies are along the vehicle width direction, the length in the axis direction of the canister bodies does not be affected even if the power control unit and the like disposed at the vehicle front side are rearranged to the vehicle rear side. That is, the length in the axis direction of the canister bodies may be maintained in a certain length without depending on sizes of components disposed at the vehicle front or rear section.

In this manner, the high pressure canister unit configured as described above may increase flexibility in the design.

In the second aspect, the canister bodies arrayed at a vehicle rear side of the high pressure canister unit may be stacked in a vehicle vertical direction.

In the above configuration, the fuel capacity may be increased by stacking the canister bodies.

In this manner, the high pressure canister unit configured as described above may increase the fuel capacity.

In the second aspect in plan view, both vehicle width direction sides of a vehicle rear end portion of the case may be indented toward the vehicle front.

In the above configuration, the case may be suppressed from impinging on peripheral components even if the case is installed at a rear end section of the vehicle.

In this manner, the fuel cell vehicle configured as described above is capable of suppressing the case from impinging on peripheral components, while securing fuel capacity.

BRIEF DESCRIPTION OF THE DRAWINGS

An exemplary embodiment of the present disclosure will be described in detail based on the followings figures, wherein:

FIG. 7 is an exploded perspective view of a high pressure canister unit according to a second exemplary embodiment.

FIG. 11 is an enlarged cross-section corresponding to a section along line 11-11 of FIG. 10.

DETAILED DESCRIPTION

First Exemplary Embodiment

Figure 1:
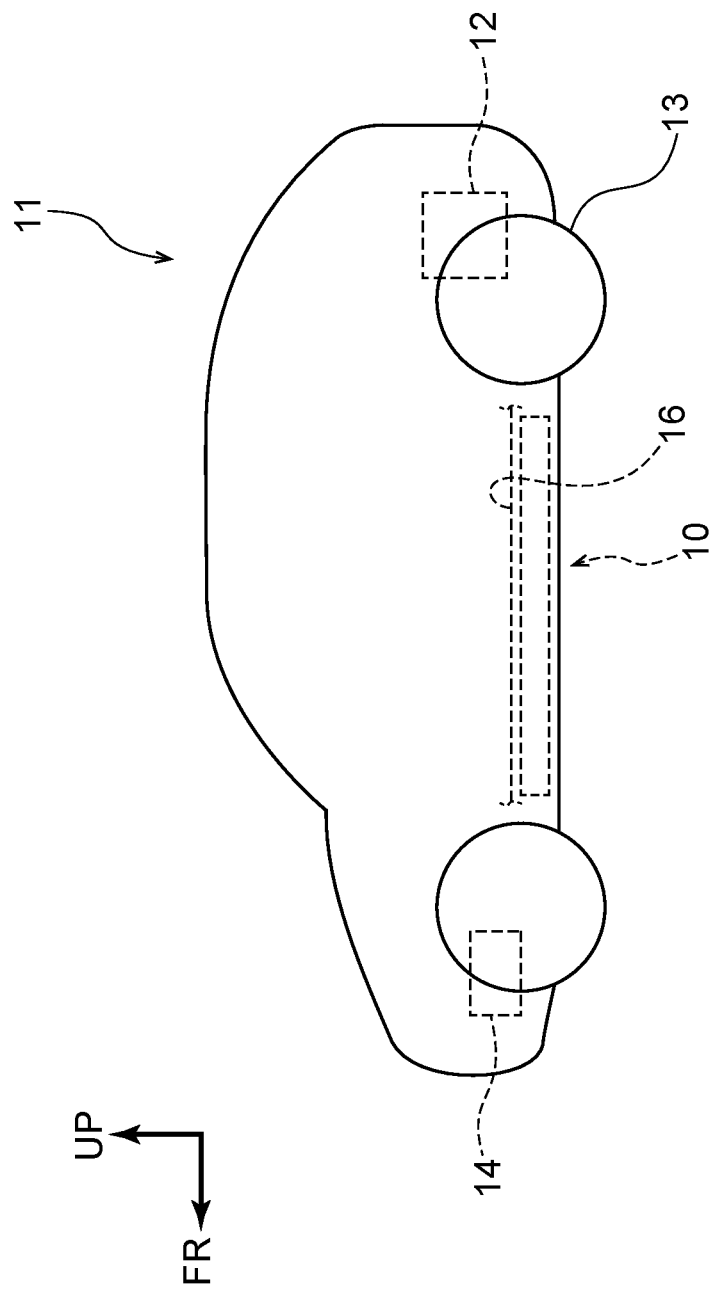
FIG. 1 is a schematic side view illustrating a fuel cell vehicle mounted with a high pressure canister unit according to a first exemplary embodiment.

Explanation follows regarding a fuel cell vehicle 11 mounted with a high pressure canister unit 10 according to a first exemplary embodiment, with reference to the drawings. Note that in the drawings, the arrow FR, the arrow UP, and the arrow RH respectively indicate the front direction, upward direction, and vehicle right side of the fuel cell vehicle 11. In the following explanation, unless specifically stated otherwise, reference simply to the front, rear, up, down, left, and right directions refers to the front and rear in a vehicle front-rear direction, up and down in a vehicle vertical direction, and the left and right in a vehicle width direction when oriented in the direction of forward travel.

As illustrated in FIG. 1, the fuel cell vehicle 11 (referred to as the "vehicle 11" hereafter) provided with the high pressure canister unit 10 according to the first exemplary embodiment includes a drive motor 12, a fuel cell stack (FC stack) 14, and the high pressure canister unit 10.

As an example in the first exemplary embodiment, the drive motor 12 is disposed in a vehicle rear section. When the drive motor 12 is driven, output of the drive motor 12 is transmitted to rear wheels 13 through a transmission, not illustrated in the drawings.

The FC stack 14 is provided in a vehicle front section. The FC stack 14 has a stacked structure configured by plural layers of single cells, these being configuration units, and functions as a high voltage power source. Each single cell configuring the FC stack 14 generates electricity through an electrochemical reaction between hydrogen gas supplied from the high pressure canister unit 10, described later, and compressed air supplied from an air compressor, not illustrated in the drawings. The vehicle 11 is also provided with a storage battery, not illustrated in the drawings. The storage battery is a rechargeable battery, and a nickel-hydrogen secondary battery, a lithium-hydrogen secondary battery, or the like may be employed therefor. Electric power is supplied to the drive motor 12 from the storage battery in order to drive the drive motor 12, and regenerated power from the drive motor 12 is recovered by regenerative deceleration.

The high pressure canister unit 10 is disposed at a vehicle lower side of a floor panel 16 configuring a floor surface of a vehicle cabin. Moreover, as illustrated in FIG. 2, the high pressure canister unit 10 includes plural canister bodies 18, tubes 20, 21 serving as coupling members, a case 22, and a leader tube 32.

Figure 3:
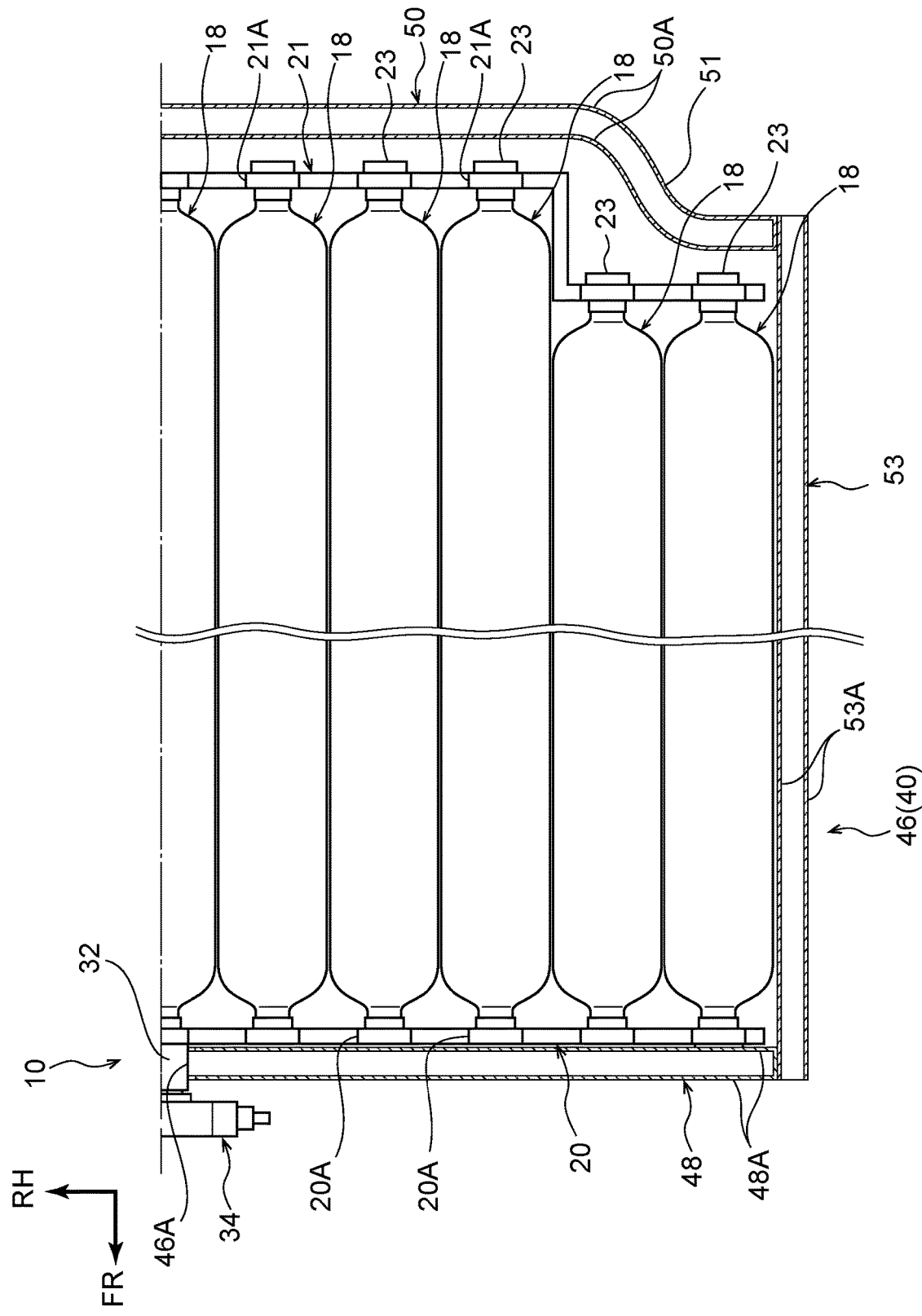
FIG. 3 is a plan view cross-section of the half the high pressure canister unit according to the first exemplary embodiment located on the left side of a vehicle.

As illustrated in FIG. 3, the canister bodies 18 are formed in elongated, substantially circular cylinder shapes with their length direction along the axial direction. Plural of the canister bodies 18 are arranged alongside each other. As an example in the first exemplary embodiment, eleven of the canister bodies 18 having their axial directions running in the vehicle front-rear direction are disposed at uniform intervals across the vehicle width direction (for ease of explanation, in FIG. 3 only the left half of the vehicle is illustrated, and six of the canister bodies 18 are illustrated).

The positions of vehicle front ends of the eleven canister bodies 18 are aligned with each other, and the seven canister bodies 18 nearest the vehicle center have the same axial direction lengths as each other. The two canister bodies 18 on the left of the vehicle and the two canister bodies 18 on the right of the vehicle are formed with shorter vehicle front-rear direction (axial direction) lengths than the other canister bodies 18. Rear end portions of these four canister bodies 18 are therefore positioned further toward the vehicle front than rear end portions of the other canister bodies 18.

Figure 2:
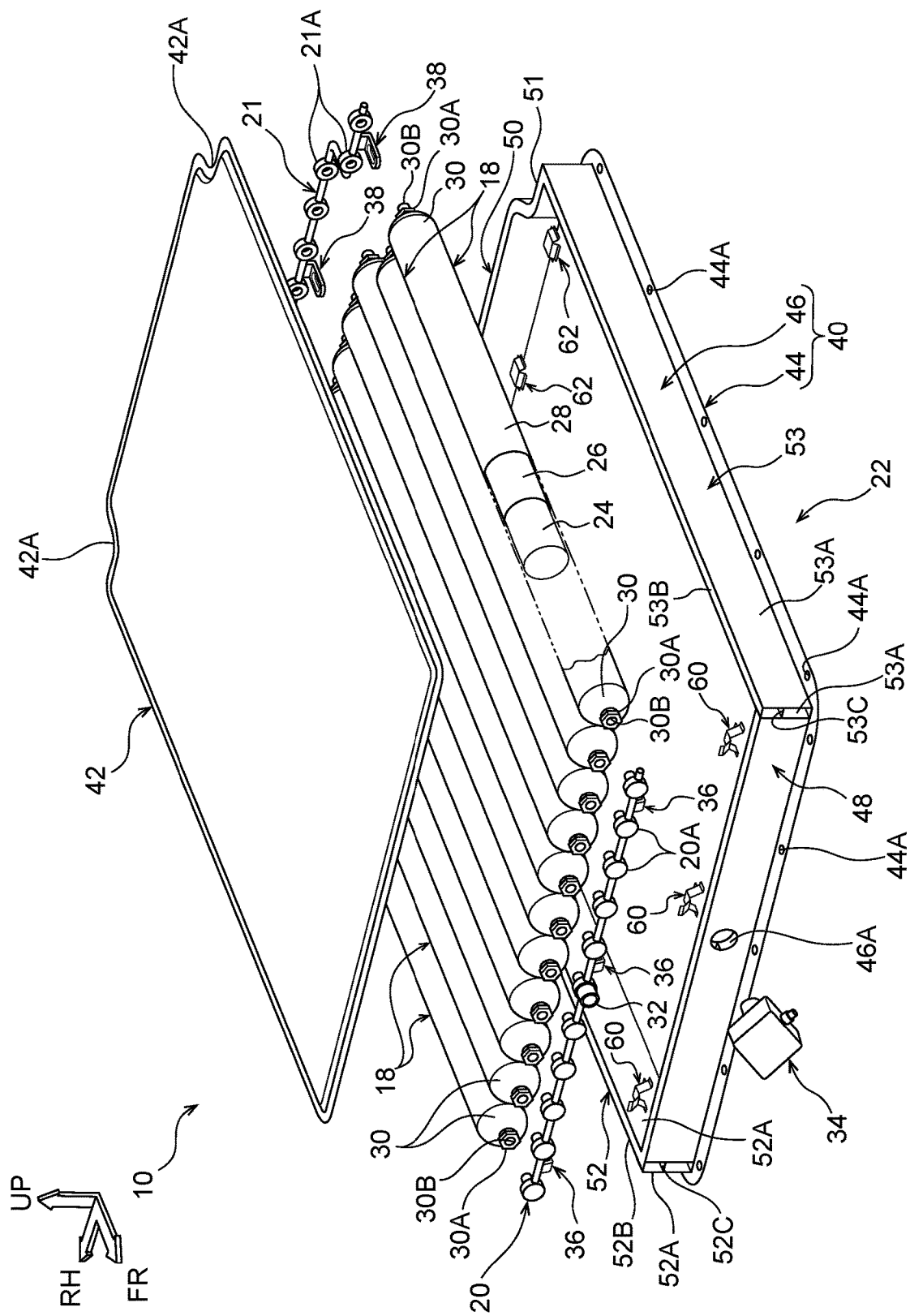
FIG. 2 is an exploded perspective view of the high pressure canister unit according to the first exemplary embodiment.

As illustrated in FIG. 2, each of the canister bodies 18 includes a casing body 24, caps 30, a first reinforcing layer 26, and a second reinforcing layer 28. Each casing body 24 has a circular cylinder shape open at both axial direction end portions, and is, for example, configured from an aluminum alloy in the first exemplary embodiment. However, this is not limiting and the casing body 24 may be formed from resin or the like.

The caps 30 are provided at both axial direction end portions of each casing body 24. Each cap 30 has its axial direction running along the vehicle front-rear direction, and has a substantially hemispherical shape protruding toward the axial direction outer side of the casing body 24. The two end portions of each casing body 24 are closed off by the caps 30. In the first exemplary embodiment, the caps 30 at the vehicle front and the caps 30 at the vehicle rear are configured similarly to each other. Moreover, a connector 30A projects toward the axial direction outer side from a leading end portion of each cap 30. Each connector 30A is provided with an opening 30B. The openings 30B are connected to the tubes 20, 21, described later.

The first reinforcing layer 26 is provided on an outer peripheral face of the casing body 24. The first reinforcing layer 26 is formed from carbon fiber reinforced plastic (CFRP). Specifically, a sheet of CFRP that has been impregnated with a thermosetting resin such as an epoxy resin is wrapped around the outer peripheral face of the casing body 24 and heated to form the first reinforcing layer 26. Although not illustrated in the drawings, the direction of the fibers in the first reinforcing layer 26 is a direction running in a circumferential direction of the casing body 24.

The second reinforcing layer 28 is provided at an outer peripheral face of the first reinforcing layer 26. The second reinforcing layer 28 is formed from CFRP. Specifically, CFRP filaments that have been impregnated with a thermosetting resin such as an epoxy resin are wrapped around outer peripheral faces of the first reinforcing layer 26 and the caps 30, and then heated so as to form the second reinforcing layer 28. Although not illustrated in the drawings, the fiber orientation in the second reinforcing layer 28 is the axial direction of the casing body 24, or a direction inclined by a predetermined angle with respect to the axial direction.

The canister bodies 18 configured as described above are coupled together in the vehicle width direction by the tubes 20, 21. The tube 20 is an elongated tube extending in the vehicle width direction (i.e., the array direction of the canister bodies 18) and disposed at the vehicle front of the canister bodies 18. The tube 20 is provided with attachment portions 20A that are attached to the connectors 30A of the caps 30. Plural of the attachment portions 20A are provided corresponding to the positions of the canister bodies 18, with eleven of the attachment portions 20A being provided in the first exemplary embodiment. Each of the attachment portions 20A is provided with a male thread projecting toward the respective canister body 18, and the opening 30B (connector 30A) of the cap 30 is screwed onto the male thread, thereby fixing the canister bodies 18 to the tube 20. A flow path is formed through the interior of the tube 20, and the interiors of the plural canister bodies 18 are in communication with each other through this flow path. The tube 20 is also provided with plural front attachment tabs 36. The front attachment tabs 36 will be described in detail later.

The leader tube 32 is provided at a vehicle width direction intermediate portion of the tube 20 (i.e., an intermediate portion in the array direction of the canister bodies 18). The leader tube 32 is a cylinder body projecting from the tube 20 toward the vehicle front, and is provided at the attachment portion 20A at the vehicle width direction center of the tube 20 in the first exemplary embodiment. The leader tube 32 leads out to the exterior through a through hole 46A formed in a peripheral wall 46 of the case 22, described later. A valve 34 that is capable of opening and closing the flow path through the tube 20 is attached to the leader tube 32.

The tube 21 is disposed at the vehicle rear of the canister bodies 18. The rear end portions of the canister bodies 18 are coupled together in the vehicle width direction by the tube 21. The tube 21 is provided with plural (eleven in the first exemplary embodiment) attachment portions 21A, similarly to the tube 20. The attachment portions 21A are provided with insertion holes through which the connectors 30A of the caps 30 are inserted. As illustrated in FIG. 3, the tube 21 is fixed to the canister bodies 18 by screwing bolts 23 into the openings 30B (see FIG. 2) of the connectors 30A from the axial direction outer side, in a state in which the connectors 30A are inserted through the attachment portions 21A. Moreover, a flow path is formed through the interior of the tube 21, and the interiors of the plural canister bodies 18 are in communication with each other through this flow path. As illustrated in FIG. 2, the tube 21 is provided with plural rear attachment tabs 38. The rear attachment tabs 38 will be described in detail later.

The canister bodies 18 and the tube 20 are housed in the case 22. The case 22 is formed in a substantially rectangular box shape in plan view, and includes a case body 40 and a cover member 42.

The case body 40 has a box shape that is open at an upper side, and includes a bottom wall 44 and a peripheral wall 46. The bottom wall 44 is formed from an aluminum alloy or the like, and is configured in a substantially rectangular shape with rounded corners in plan view. Attachment holes 44A are formed at intervals around an outer peripheral portion of the bottom wall 44, enabling the bottom wall 44 to be fastened to framework members such as rockers using fastening members such as bolts.

The peripheral wall 46 projects upward from the bottom wall 44 and is formed from an extruded aluminum alloy component. The peripheral wall 46 has a rectangular frame shape in plan view. The outer profile of the peripheral wall 46 is formed large enough to surround the plural canister bodies 18, and in the first exemplary embodiment, the peripheral wall 46 is large enough to house the eleven canister bodies 18.

The peripheral wall 46 includes a front wall 48 extending in the vehicle width direction at the vehicle front side, a rear wall 50 extending in the vehicle width direction at the vehicle rear side, and a right wall 52 and a left wall 53 coupling the two end portions of the front wall 48 and the rear wall 50 together in the vehicle front-rear direction. The front wall 48, the rear wall 50, the right wall 52, and the left wall 53 are each configured with closed cross-section structures. This will be described in detail later.

Figure 4:
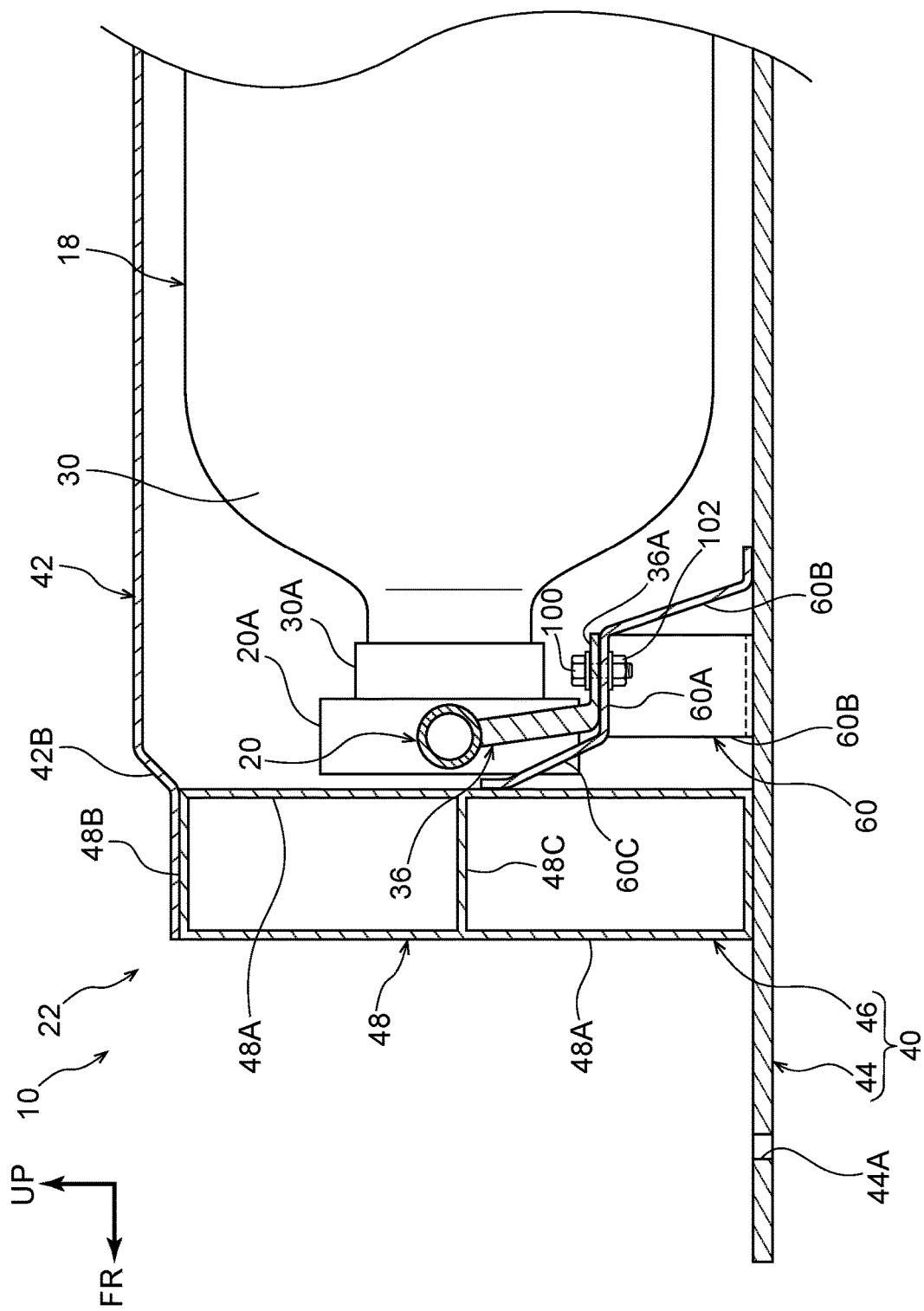
FIG. 4 is an enlarged side view illustrating a front end section of the high pressure canister unit according to the first exemplary embodiment.

As illustrated in FIG. 4, the front wall 48 is formed with a closed cross-section profile as viewed along the vehicle width direction. Specifically, the front wall 48 includes a front and rear pair of front vertical walls 48A projecting upward from the bottom wall 44 at a vehicle front-rear direction separation to each other, a front upper wall 48B coupling upper end portions of the front vertical walls 48A together from front to rear, and a front intermediate wall 48C coupling vertical direction intermediate portions of the front vertical walls 48A together from front to rear.

As illustrated in FIG. 2, the through hole 46A penetrating the front wall 48 in the vehicle front-rear direction is formed through a vehicle width direction central portion of the front wall 48. As illustrated in FIG. 3, the leader tube 32 provided to the tube 20 leads out to the exterior of the case 22 through the through hole 46A. Moreover, the valve 34 that is capable of opening and closing the flow path through the tube 20 is attached to the leader tube 32. This enables the amount of fluid flowing through the flow path to be controlled. One end portion of a non-illustrated tube is connected to the valve 34, and the other end portion of this tube is connected to the FC stack or the like.

Figure 5:
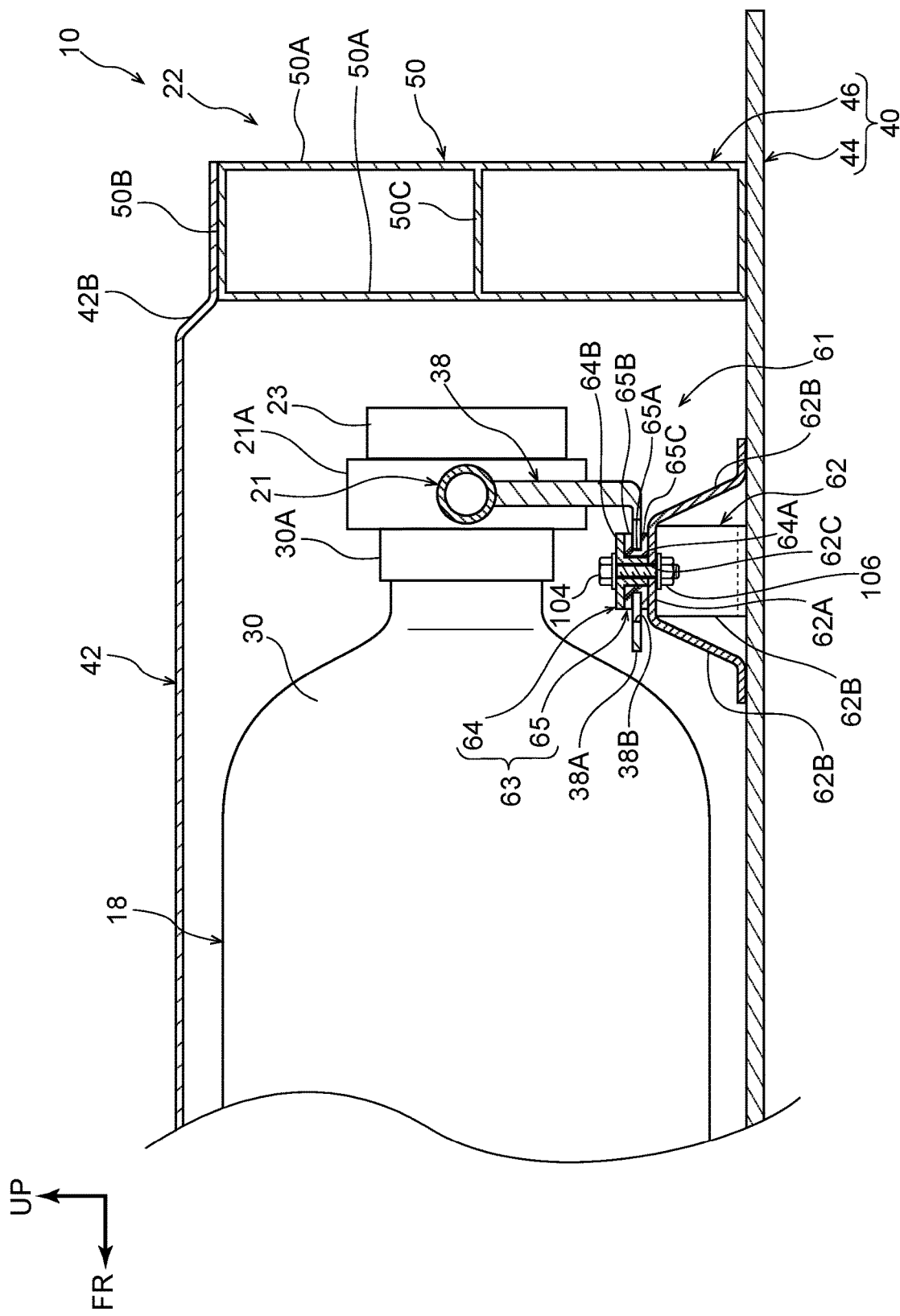
FIG. 5 is an enlarged side view illustrating a rear end section of the high pressure canister unit according to the first exemplary embodiment.

As illustrated in FIG. 5, similarly to the front wall 48, the rear wall 50 is formed with a closed cross-section profile as viewed along the vehicle width direction. Namely, the rear wall 50 includes a front and rear pair of rear vertical walls 50A projecting upward from the bottom wall 44 at a vehicle front-rear direction separation to each other, a rear upper wall 50B coupling upper end portions of the rear vertical walls 50A together from front to rear, and a rear intermediate wall 50C coupling vertical direction intermediate portions of the rear vertical walls 50A together from front to rear.

As illustrated in FIG. 2, as viewed along the vehicle front-rear direction, the right wall 52 and the left wall 53 are each formed with closed cross-section profiles similarly to the front wall 48 and the rear wall 50. The right wall 52 includes a pair of left and right vertical walls 52A projecting upward from the bottom wall 44 at a vehicle width direction separation to each other, a right upper wall 52B coupling upper end portions of the right vertical walls 52A together from left to right, and a right intermediate wall 52C coupling vertical direction intermediate portions of the right vertical walls 52A together from left to right. The left wall 53 includes a pair of left and right left vertical walls 53A projecting upward from the bottom wall 44 at a vehicle width direction separation to each other, a left upper wall 53B coupling upper end portions of the left vertical walls 53A together from left to right, and a left intermediate wall 53C coupling vertical direction intermediate portions of the left vertical walls 53A together from left to right. The peripheral wall 46 is formed as a frame member with a closed cross-section structure configured as described above.

As illustrated in FIG. 3, in plan view, indentations 51 indented toward the vehicle front are formed at both vehicle width direction sides of a rear end portion of the peripheral wall 46 (only the indentation 51 on the left of the vehicle is illustrated in FIG. 3). The vehicle front-rear direction length of the interior of the case 22 is thus shorter at the two vehicle width direction end portions than at a vehicle width direction central portion. The canister bodies 18 housed at the two vehicle width direction sides are thus canisters that are shorter in length in the vehicle front-rear direction (axial direction) than the other canister bodies 18, as described above.

As illustrated in FIG. 2, the cover member 42 is formed in a flat plate shape from an aluminum alloy or the like, and has a profile corresponding to that of the peripheral wall 46. Indentations 42A indented toward the vehicle front in plan view are therefore formed corresponding to the peripheral wall 46 at both vehicle width direction end portions of a rear end portion of the cover member 42. As illustrated in FIG. 4 and FIG. 5, a step 42B is formed along an outer peripheral edge portion of the cover member 42. A portion at the peripheral outside of the step 42B overlaps an upper face of the peripheral wall 46 and is fastened thereto using fastening members such as bolts. The upper opening of the case body 40 is thus closed off by the cover member 42. Note that a gap is provided between the cover member 42 and the canister bodies 18, which forms a structure that suppresses, for example, noise caused by contact between the cover member 42 and the canister bodies 18.

As illustrated in FIG. 2, first attachment brackets 60 serving as attachment brackets are provided at the vehicle front portion of the bottom wall 44. Plural of the first attachment brackets 60 are provided at intervals along the vehicle width direction, with three of the first attachment brackets 60 being provided in the first exemplary embodiment.

As illustrated in FIG. 4, the first attachment brackets 60 are brackets that are joined to the bottom wall 44 and the front wall 48 (the peripheral wall 46) and that support the tube 20. Each first attachment bracket 60 includes a support portion 60A, legs 60B, and a front extension portion 60C.

The support portion 60A is a flat plate shaped location formed with a substantially rectangular shape in plan view, and is disposed at a position separated from the bottom wall 44 toward the top of the vehicle. Three of the legs 60B extend toward the bottom wall 44 from a rear end and the two vehicle width direction ends of the support portion 60A (only a leg 60B extending toward the vehicle rear and a leg 60B extending toward the right of the vehicle are illustrated in FIG. 4). Each of the legs 60B extends diagonally downward from the support portion 60A toward the bottom wall 44, and a lower end portion of each leg 60B is bent so as to run along the bottom wall 44 and is joined to the bottom wall 44.

The front extension portion 60C extends diagonally upward from a front end portion of the support portion 60A toward the peripheral wall 46. A front end portion of the front extension portion 60C is bent upward so as to run along the peripheral wall 46 and is joined to the front wall 48 (i.e., the peripheral wall 46).

The front attachment tabs 36 are provided to the tube 20. Each front attachment tab 36 extends downward from between neighboring attachment portions 20A on the tube 20, and a lower end portion of each front attachment tab 36 is provided with a flange 36A that is bent toward the vehicle rear. Each flange 36A is overlapped with the support portion 60A of the corresponding first attachment bracket 60 and fixed thereto using a bolt 100 and a nut 102.

As illustrated in FIG. 2, second attachment brackets 62, serving as attachment brackets, are provided at the vehicle rear portion of the bottom wall 44. Plural of the second attachment brackets 62 are provided at intervals along the vehicle width direction, with three of the second attachment brackets 62 being provided in the first exemplary embodiment (only two of the second attachment brackets 62 are illustrated in FIG. 2). The second attachment brackets 62 are provided at positions corresponding to the first attachment brackets 60 in the vehicle width direction.

As illustrated in FIG. 5, the second attachment brackets 62 are brackets that are joined to the bottom wall 44 and that support the tube 21. Each second attachment bracket 62 includes a support portion 62A and legs 62B.

The support portion 62A is a flat plate shaped location formed with a substantially rectangular shape in plan view, and is disposed at a position separated from the bottom wall 44 toward the top of the vehicle. At a central portion of the support portion 62A, a first attachment hole 62C is formed penetrating the support portion 62A in its thickness direction. Four of the legs 62B extend from front, rear, left, and right end portions of the support portion 60A toward the bottom wall 44. Each leg 62B extends diagonally downward from the support portion 62A toward the bottom wall 44, and a lower end portion of each leg 62B is bent so as to run along the bottom wall 44 and is joined to the bottom wall 44.

The rear attachment tabs 38 are provided to the tube 21. Each rear attachment tab 38 extends downward from between neighboring attachment portions 21A on the tube 21, and a lower end portion of each rear attachment tab 38 is provided with a flange 38A that is bent toward the vehicle front.

A second attachment hole 38B is formed in each flange 38A. The second attachment hole 38B is an elongated hole with its length direction along the axial direction of the canister bodies 18. A bolt 104 is inserted through the first attachment hole 62C formed in the support portion 62A of the second attachment bracket 62 and through the second attachment hole 38B in the flange 38A. The bolt 104 is screwed together with a nut 106 at a lower face of the support portion 62A, thereby fastening the support portion 62A and the flange 38A together.

A resin collar 63 is provided between each second attachment bracket 62 and each rear attachment tab 38. The resin collar 63 is fastened together with the support portion 62A and the flange 38A. The resin collar 63 is configured by an upper collar 64 and a lower collar 65. The upper collar 64 includes an upper ring 64A extending along the axial direction of the bolt 104. The internal diameter of the upper ring 64A is formed slightly larger than a shaft of the bolt 104, and the shaft of the bolt 104 is inserted through the upper ring 64A. A flange 64B extends toward the radial direction outside from an upper end portion of the upper ring 64A.

The lower collar 65 includes a lower ring 65A extending along the axial direction of the bolt 104. The upper ring 64A is inserted through the lower ring 65A. An upper flange 65B extends radially outward from an upper end portion of the lower ring 65A, and the upper flange 65B is interposed between the flange 64B of the upper collar 64 and the flange 38A of the rear attachment tab 38. A lower flange 65C extends radially outward from a lower end portion of the lower ring 65A, and the lower flange 65C is interposed between the flange 38A of the rear attachment tab 38 and the support portion 62A of the second attachment bracket 62. The rear attachment tabs 38 are thus capable of moving in the axial direction of the canister bodies 18 with respect to the second attachment brackets 62.

The tube 20 and the tube 21 at both ends of the canister bodies 18 are supported by the first attachment brackets 60 and the second attachment brackets 62 respectively. Namely, the canister bodies 18 are supported by the first attachment brackets 60 and the second attachment brackets 62 in a state in which the canister bodies 18 do not contact the bottom wall 44 (i.e., in a raised state above the bottom wall 44).

Operation and Effects

Next, explanation follows regarding operation and effects of the first exemplary embodiment.

The high pressure canister unit 10 mounted to the vehicle 11 of the first exemplary embodiment is provided with the plural circular cylinder shaped canister bodies 18 arrayed as illustrated in FIG. 2. The respective canister bodies 18 are coupled together at one axial direction end portion by the tube 20, and are coupled together at the other axial direction end portion by the tube 21. The interiors of the canister bodies 18 are thus placed in communication with each other through the tubes 20, 21. The leader tube 32 is provided to the tube 20, and the valve 34 is attached to the leader tube 32. This thereby enables fuel to be filled, or fuel to be fed out, by opening and closing the valve 34 alone, even when the number of the canister bodies 18 is increased in order to increase capacity. Namely, the plural canister bodies 18 configure a unit functioning as a single high pressure canister, enabling capacity to be increased with a simple structure. Further, since the tube 20 is disposed at the vehicle front side of the high pressure canister unit 10, fuel supply to the FC stack 14 disposed at the front section of the vehicle may be performed smoothly.

Moreover, in the first exemplary embodiment, the canister bodies 18 and the tubes 20, 21 are housed in the box shaped case 22, and the leader tube 32 leads out from the tube 20 to the exterior of the case 22. Housing the plural canister bodies 18 in the case 22 in this manner enables the canister bodies 18 and the tubes 20, 21 to be protected, enabling shock resistance to be secured. Namely, in the high pressure canister unit 10 of the first exemplary embodiment, capacity may be increased with a simple structure, while also securing shock resistance.

Moreover, the first exemplary embodiment has a structure in which the valve 34 is attached to the leader tube 32 leading out to the exterior of the case 22, thereby allowing access to the valve 34 even when the cover member 42 of the case 22 is in a closed state. Namely, there is no need to open the cover member 42 in order to detach a tube from the valve 34, for example, enabling an improvement in serviceability compared to structures in which the valve 34 is provided inside the case 22.

Moreover, in the first exemplary embodiment, since the leader tube 32 is provided at an intermediate portion in the array direction of the canister bodies 18, when filling the plural canister bodies with fuel via the tube 20, the fuel passes through the leader tube 32 provided to the intermediate portion of the tube 20 and flows to each of the canister bodies 18 substantially uniformly. This thereby enables the respective canister bodies 18 to be suppressed from being filled with uneven amounts of fuel. Moreover, when the fuel with which the canister bodies 18 have been filled is being fed to the exterior, an approximately equal amount of fuel may be fed from each of the canister bodies 18. When the internal pressure of the canister bodies 18 is very high, large temperature fluctuations occur as a result of pressure changes. However, in the first exemplary embodiment, the amount of fuel in each of the canister bodies 18 changes by an approximately equal amount. This thereby enables variation in the temperature of the respective canister bodies 18 in the case 22 as a result of pressure changes in the canister bodies 18 to be suppressed.

Moreover, in the first exemplary embodiment, the case 22 includes the case body 40 and the cover member 42, thereby enabling foreign objects and the like to be prevented from entering the case body 40. Since the peripheral wall 46 of the case body 40 has a closed cross-section structure, deformation of the peripheral wall 46 may be better suppressed than in structures in which the peripheral wall 46 is formed from a plate shaped member. This thereby enables shock to be suppressed from being input to the canister bodies 18 in the case 22. Namely, the intrusion of foreign objects into the case 22 may be prevented, and the shock resistance of the case 22 may also be enhanced.

Moreover, in the first exemplary embodiment, the canister bodies 18 are supported by the first attachment brackets 60 and the second attachment brackets 62 in a state in which the canister bodies 18 do not contact the bottom wall 44. Namely, the canister bodies 18 are in a raised state above the bottom wall 44. This thereby enables direct input of shock to the canister bodies 18 from the bottom wall 44 to be prevented if, for example, the case 22 comes into contact with a road surface. Moreover, noise caused by contact between the bottom wall 44 and the canister bodies 18 may also be suppressed.

Moreover, as illustrated in FIG. 1, in the vehicle 11 of the first exemplary embodiment, the high pressure canister unit 10 is disposed below the floor panel 16, thereby enabling placement space for the high pressure canister unit 10 to be secured without reducing the size of the cabin space or a luggage space. Moreover, as illustrated in FIG. 2, both vehicle width direction sides of the vehicle rear end portion of the case 22 are indented toward the vehicle front in plan view, thereby enabling the corners of the rear end portion of the case 22 to be prevented from impinging on peripheral components such as tires, while securing fuel capacity.

In the first exemplary embodiment, the positions of vehicle front ends of the eleven canister bodies 18 are aligned with each other as illustrated in FIG. 3. However, the disclosure is not limited to this and, for example, a configuration of a variant embodiment as illustrated in FIG. 6 may be adopted.

Variant Embodiment

Figure 6:
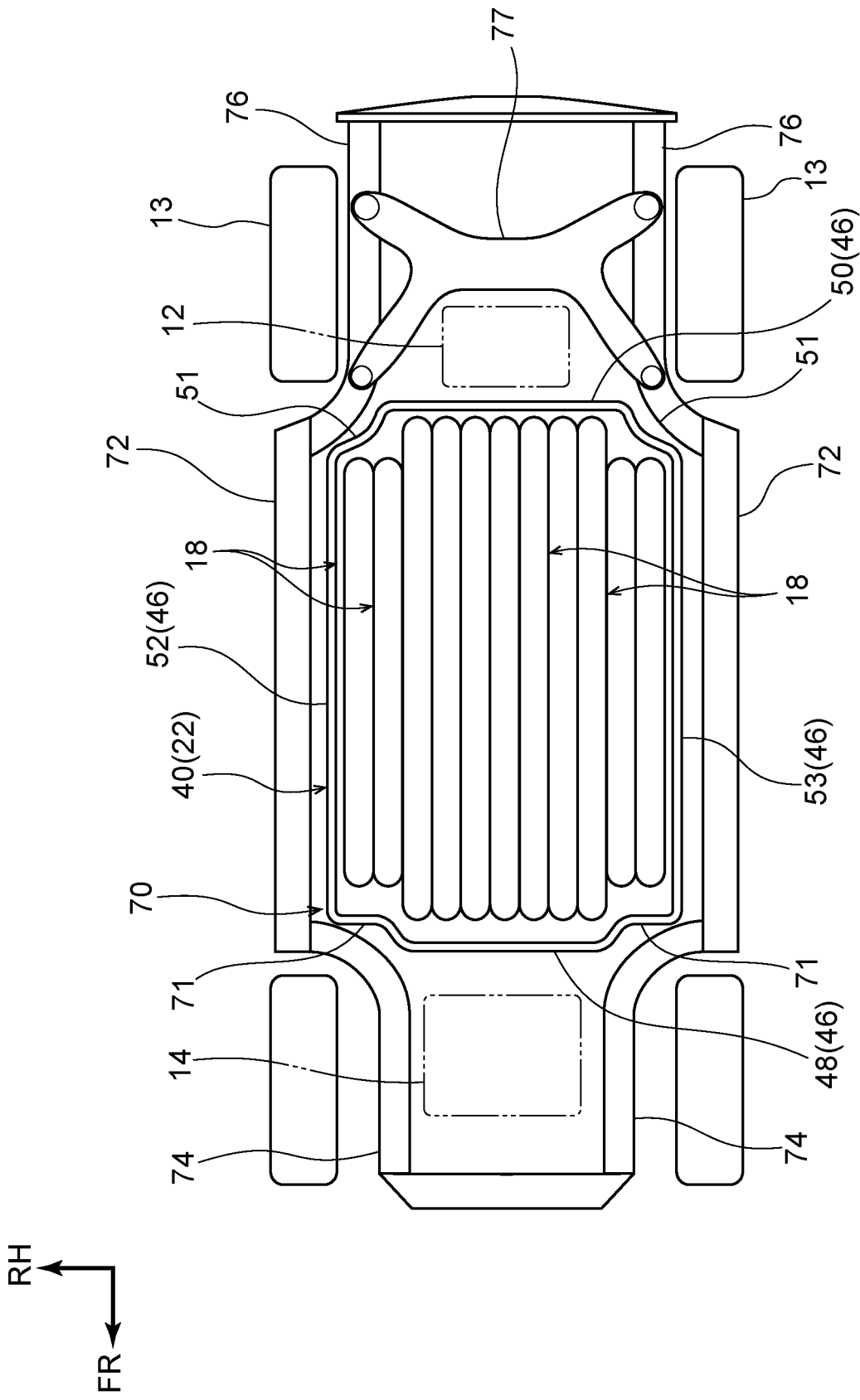
FIG. 6 is a schematic plan view illustrating a fuel cell vehicle mounted with a high pressure canister unit according to a variant embodiment of the first exemplary embodiment.

As illustrated in FIG. 6, in a high pressure canister unit 70 of the variant embodiment, plural canister bodies 18 are arrayed in the vehicle width direction with their axis directions laid along the vehicle front-rear direction. Seven canister bodies 18 disposed at the central portion in the vehicle width direction are configured to have the same length in their axis directions.

Two canister bodies 18 at the vehicle left side and two canister bodies 18 at the vehicle right side are configured to have a shorter length in the vehicle front-rear direction (i.e., in their axis directions) than the other canister bodies 18. The rear ends of these four canister bodies 18 position at the vehicle front side than the rear ends of the other canister bodies 18. Further, the front ends of these four canister bodies 18 position at the vehicle rear side than the front ends of the other canister bodies 18. For ease of explanation, in FIG. 6 the illustration of the high pressure canister unit 70 is simplified and the tubes 20, 21 and valve 34 are omitted.

The high pressure canister unit 70 is fastened to a pair of left and right rockers 72 that extend in the vehicle front-rear direction. A pair of left and right front side members 74 are disposed at the vehicle front side of the rockers 72. The front side members 74 extend in the vehicle front-rear direction while sandwiching the FC stack 14 and a power control unit (PCU) that is not illustrated. The rear ends of the front side members 74 are bent so as to protrude toward the vehicle width direction inner side and vehicle rear side, and are connected to the rockers 72.

A pair of left and right rear side members 76 are disposed at the vehicle rear side of the rockers 72. A suspension member 77 is mounted to the rear side members 76. The drive motor 12 is disposed between the suspension member 77 and the high pressure canister unit 70 in plan view. The front ends of the rear side members 76 are bent so as to protrude toward the vehicle width direction inner side and vehicle front side, and are connected to the rockers 72.

Both vehicle width direction ends of the rear wall 50 configuring the peripheral wall 46 of the case body 40 of the high pressure canister unit 70 are formed to be the indentations 51 indented toward the vehicle front in plan view. Further, both vehicle width direction ends of the front wall 48 configuring the peripheral wall 46 are formed to be indentations 71 indented toward the vehicle rear in plan view. In other words, the peripheral wall 46 of the case body 40 has a shape in which the central portion in the vehicle width direction is enlarged along the vehicle front-rear direction. This configuration allows elongating the axis direction lengths of the canister bodies 18 and securing fuel capacity, while suppressing interferences between the case body 40, and the frame members and peripheral members of the vehicle.

Second Exemplary Embodiment

Figure 8A:
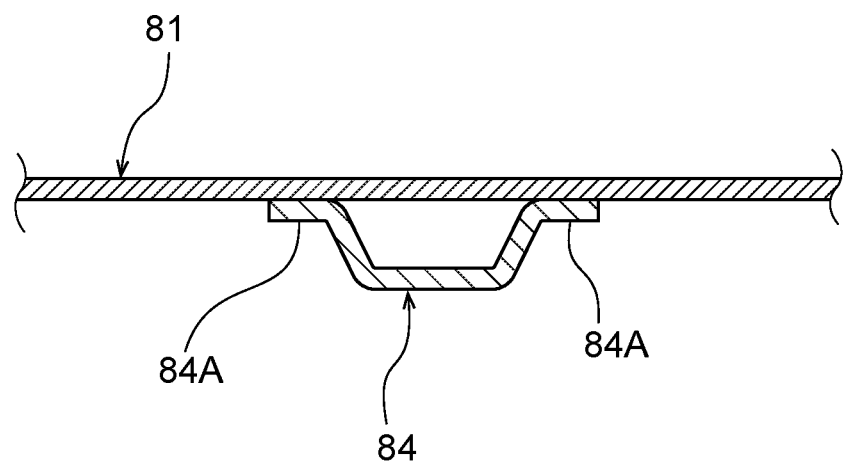
FIG. 8A is an enlarged cross-section corresponding to a section along line 8A-8A of FIG. 7.
Figure 8B:
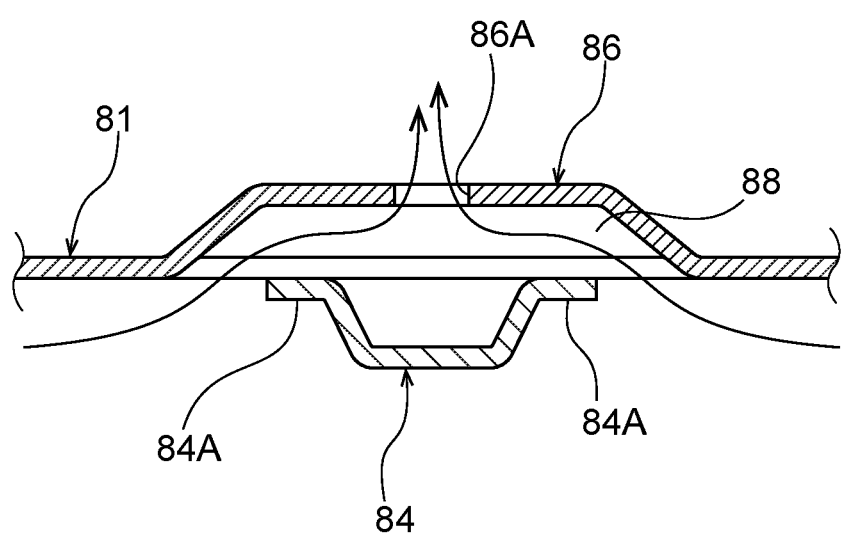
FIG. 8B is an enlarged cross-section corresponding to a section along line 8B-8B of FIG. 7.
Figure 9:
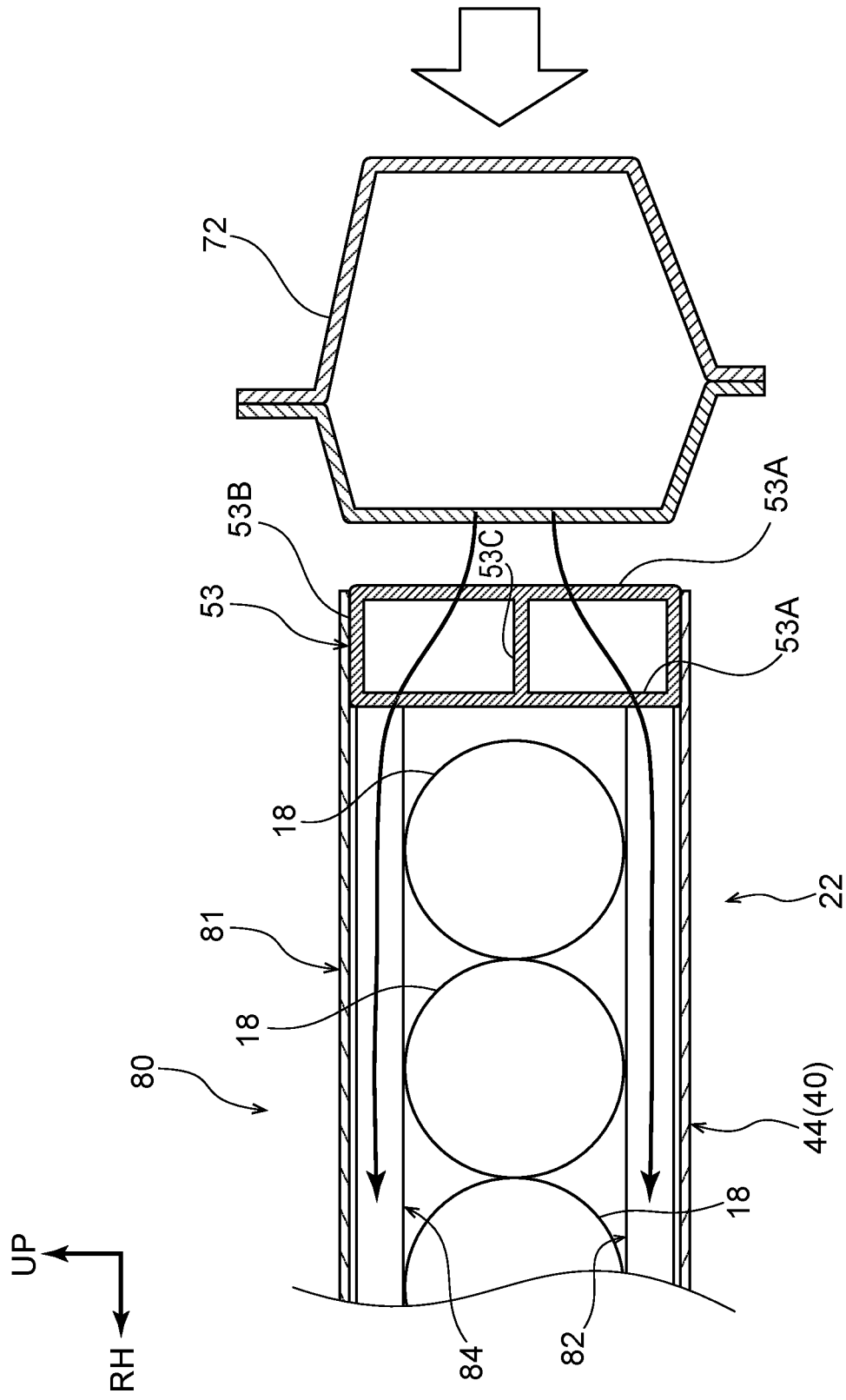
FIG. 9 is an enlarged cross-section of the relevant portion of the high pressure canister unit of the second exemplary embodiment, seen from vehicle front side.

Next, explanation follows regarding a high pressure canister unit 80 according to a second exemplary embodiment, with reference to FIGS. 7 to 9. The configurations similar to the first exemplary embodiment are appended with the same reference numbers and detailed explanations will be omitted.

As illustrated in FIG. 7, the high pressure canister unit 80 of the second exemplary embodiment has a similar configuration to the first exemplary embodiment, except for the case 22. The case 22 of the second exemplary embodiment is formed in a substantially rectangular box shape in plan view, and includes the case body 40 and a cover member 81.

The case body 40 has a box shape that is open at an upper side, and includes the bottom wall 44 and the peripheral wall 46. The bottom wall 44 is formed from an aluminum alloy or the like, and is configured in a substantially rectangular shape with rounded corners in plan view. The peripheral wall 46 projects upward from the bottom wall 44 and is formed from an extruded aluminum alloy component. The peripheral wall 46 has a rectangular frame shape in plan view. The peripheral wall 46 includes the front wall 48 extending in the vehicle width direction at the vehicle front side, the rear wall 50 extending in the vehicle width direction at the vehicle rear side, and the right wall 52 and the left wall 53 coupling the two end portions of the front wall 48 and the rear wall 50 together in the vehicle front-rear direction.

Lower reinforcements 82 that serve as a load transmission section are disposed at the upper surface side (i.e., the canister bodies 18 side) of the bottom wall 44. For example, in the second exemplary embodiment, three lower reinforcements 82 are provided spaced apart with each other in the vehicle front-rear direction, spanning between the opposing walls of the peripheral wall 46. Specifically, the lower reinforcements 82 are provided so as to couple the right wall 52 and the left wall 53 of the peripheral wall 46.

Each of the lower reinforcements 82 is formed in a substantially hat-shape profile opened toward the vehicle lower side when seen from the vehicle width direction. Flange portions 82A extend from the front end and the rear end of the lower reinforcement 82 along the bottom wall 44. The flange portions 82A are joined to the bottom wall 44 while being superimposed on the bottom wall 44. Thus, the lower reinforcement 82 forms a closed cross-section together with the bottom wall 44.

The cover member 81 is formed in a plate shape with aluminum alloy or the like and is formed in a shape corresponding to the peripheral wall 46. Through holes 81A are formed at the four corner portions of the cover member 81. Gas inside the case 22 may be vent to the exterior through the through holes 81A.

Upper reinforcements 84 that serve as the load transmission section are disposed at the lower surface side (i.e., the canister bodies 18 side) of the case 22 (i.e., the cover member 81). For example, in the second exemplary embodiment, three upper reinforcements 84 are provided spaced apart with each other in the vehicle front-rear direction, extending from vehicle width direction one end of the cover member 81 to the other end thereof. The three upper reinforcements 84 are disposed at positions corresponding to the lower reinforcements 82.

As illustrated in FIG. 8A, each of the upper reinforcements 84 is formed in a substantially hat-shape profile opened toward the vehicle lower side when seen from the vehicle width direction. Flange portions 84A extend from the front end and the rear end of the upper reinforcement 84 along the cover member 81. The flange portions 84A are joined to the cover member 81 while being superimposed with the cover member 81. Thus, the upper reinforcement 84 forms a closed cross-section together with the cover member 81.

As illustrated in FIG. 7, bulging portions 86 are formed at a vehicle width direction central portion of the cover member 81. The bulging portions 86 are formed at positions corresponding to the upper reinforcements 84 and, as illustrated in FIG. 8B, are formed by partially bulging the cover member 81 so as to stride over the upper reinforcement 84. Therefore, a space is formed between the bulging portion 86 and the upper reinforcement 84, which serves as an air passage 88.

A vent 86A is formed in the bulging portion 86. The vent 86A is formed at the air passage 88, and is configured to allow a gas flowed into the air passage 88 to be released to the exterior.

Operation and Effects

Next, explanation follows regarding operation and effects of the second exemplary embodiment.

In a case in which a load such as collision load is input to the case 22 of the second exemplary embodiment, the load may be transmitted to a side of the case 22 opposite to the collision side via the upper reinforcements 84 and the lower reinforcements 82. For example, as illustrated in FIG. 9, in a case in which a side collision to the vehicle has occurred and a collision load has been input to the vehicle left side rocker 72, the collision load is dispersed to the upper reinforcements 84 and the lower reinforcements 82 through the left wall 53, and is transmitted along the vehicle width direction. Then, the collision load is transmitted to the vehicle right side rocker 72 through the right wall 52. Load bearing property may be improved by transmitting the load in this manner.

Specifically, because the reinforcements that serve as the load transmission section are provided both at the bottom wall 44 of the case 22 and the cover member 81, the load transmission paths are increased compared with a configuration in which the reinforcements are provided only at the bottom wall 44 or the cover member 81, and the load bearing property is improved.

Further, the air passage 88 is provided between the cover member 81 and each of the upper reinforcements 84, and the vent 86A is formed at the air passage 88. This may prevent a gas in the case 22 from remaining inside the case 22 due to being obstructed by the upper reinforcements 84, and allows the gas inside the case 22 to be effectively released to the exterior of the case 22.

In the second exemplary embodiment, the reinforcements are provided both at the bottom wall 44 of the case 22 and the cover member 81, but this is not limiting. For example, configurations may be made in which only the upper reinforcements 84 are provided, or only the lower reinforcements 82 are provided. In these configurations, although the load transmission paths may be less than in the configuration including both the upper reinforcements 84 and the lower reinforcements 82, the load bearing property is improved than a configuration without the reinforcements.

Further, in the second exemplary embodiment, the upper reinforcements 84 are disposed at the lower surface of the cover member 81 and the lower reinforcements 82 are disposed at the upper surface of the bottom wall 44. However, the disclosure is not limited to this and, for example, a configuration may be made in which the upper reinforcements 84 are disposed at the upper surface of the cover member 81. This configuration also exhibits a performance of transmitting a collision load to the opposite side of the collision. However, in the case of disposing the upper reinforcements 84 at the upper surface of the cover member 81, the upper reinforcements 84 will protrude toward the vehicle upper side. Therefore, from the viewpoint of conserving the space, it is preferable to dispose the upper reinforcements 84 at the lower surface of the cover member 81.

Third Exemplary Embodiment

Figure 10:
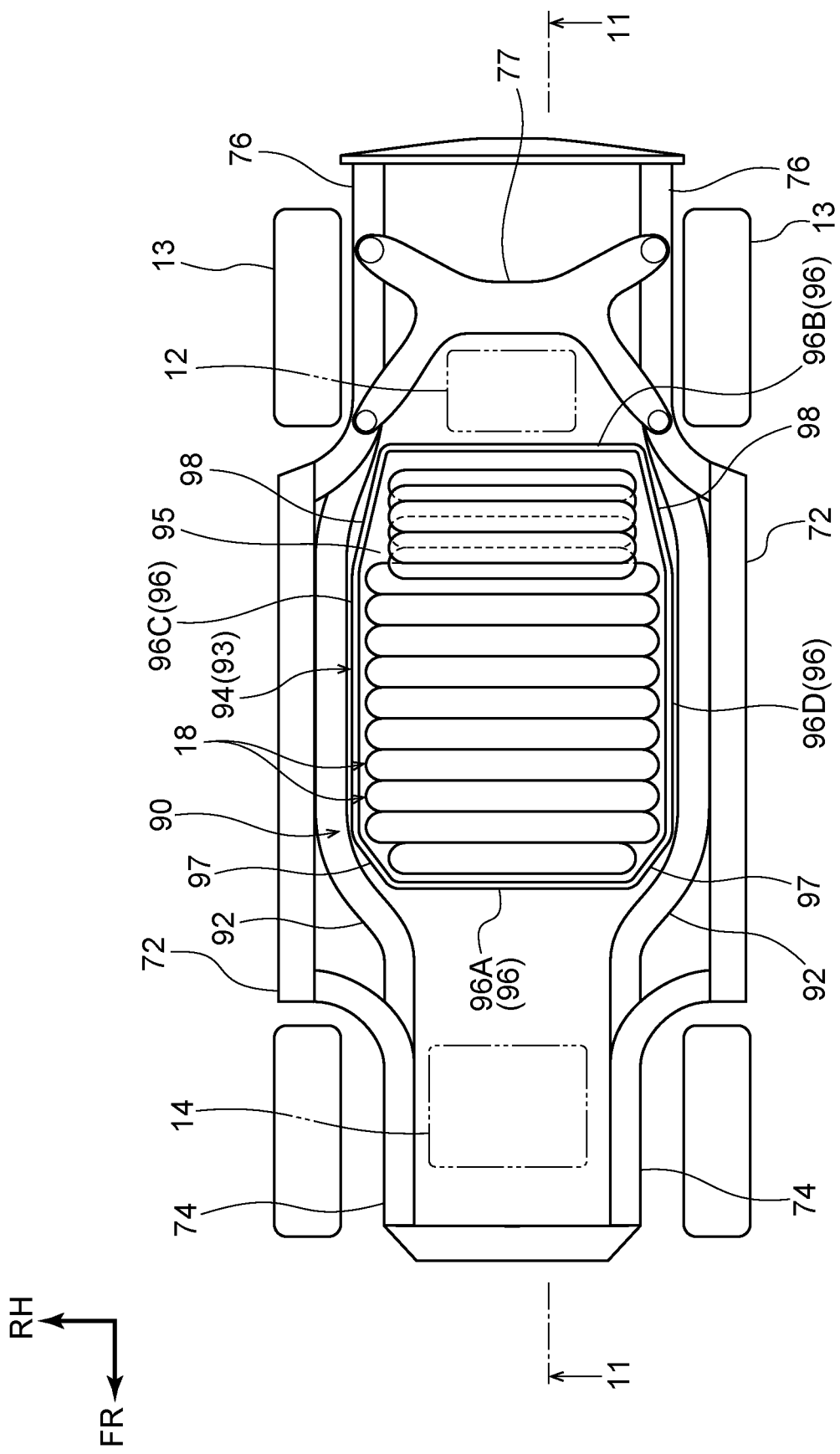
FIG. 10 is a schematic plan view illustrating a fuel cell vehicle mounted with a high pressure canister unit according to a third exemplary embodiment.

Next, explanation follows regarding a high pressure canister unit 90 according to a third exemplary embodiment, with reference to FIGS. 10 to 11. The configurations similar to the first exemplary embodiment are appended with the same reference numbers and detailed explanations will be omitted.

As illustrated in FIG. 10, the high pressure canister unit 90 of the third exemplary embodiment includes plural cylinder-shaped canister bodies 18. The canister bodies 18 are arrayed in the vehicle front-rear direction with their axis directions laid along the vehicle width direction.

Further, the canister bodies 18 arrayed at the vehicle rear side of the high pressure canister unit 90 are stacked in the vehicle vertical direction. That is, the canister bodies 18 are multi stacked at the vehicle rear side of the high pressure canister unit 90. Specifically, as illustrated in FIG. 11, the first stack of the canister bodies 18 includes 13 canister bodies 18 arrayed in the vehicle front-rear direction. Three canister bodies 18 are stacked on the four canister bodies 18 of the 13 canister bodies 18 at the rear side. The three canister bodies 18 form the second stack, while respectively being disposed at positions between pairs of the canister bodies 18 of the first stack (i.e., disposed in a staggered arrangement).

Two canister bodies 18 are stacked on the second stack of the canister bodies 18. These two canister bodies 18 form the third stack, while respectively being disposed at positions between pairs of the canister bodies 18 of the second stack (i.e., disposed in a staggered arrangement). In this manner, three stacks of the canister bodies 18 are formed at the vehicle rear side of the high pressure canister unit 90.

As illustrated in FIG. 10, the canister bodies 18 are accommodated in a case 92. The case 92 is formed in a substantially rectangular box shape in plan view, and includes a case body 94 and a cover member 91 (see also FIG. 11).

The case body 94 has a box shape that is open at an upper side, and includes a bottom wall 95 and a peripheral wall 96. The bottom wall 95 is formed from an aluminum alloy or the like, and is configured in a substantially rectangular shape with rounded corners in plan view.

The peripheral wall 96 includes a front wall 96A extending in the vehicle width direction at the vehicle front side, a rear wall 96B extending in the vehicle width direction at the vehicle rear side, and a right wall 96C and a left wall 96D coupling the two end portions of the front wall 96A and the rear wall 96B together in the vehicle front-rear direction. The front wall 96A, the rear wall 96B, the right wall 96C and the left wall 96D are respectively formed as closed cross-section structures.

In plan view, front indentations 97 indented toward the vehicle rear are formed at both vehicle width direction sides of the front wall 96A. Further, rear indentations 98 indented toward the vehicle front are formed at both vehicle width direction sides of the rear wall 96B.

As illustrated in FIG. 11, the cover member 91 is superimposed on an upper surface of the peripheral wall 96 of the case body 94, and fastened thereto by fastening members such as bolts. The cover member 91 of the third exemplary embodiment includes step portions. Specifically, the cover member 91 includes the step portions such that the vehicle rear portion of the cover member 91 positions upper than the vehicle front portion thereof, so that the height of the cover member 91 corresponds to the heights of the three stacks of the canister bodies 18.

The high pressure canister unit 90 is disposed at a vehicle lower side of a floor panel 99, and a portion of the high pressure canister unit 90 where the canister bodies 18 are stacked serves as a portion to which rear passenger seats are mounted.

As illustrated in FIG. 10, the high pressure canister unit 90 is fastened to the pair of left and right rockers 72 that extend in the vehicle front-rear direction. The pair of left and right front side members 74 are disposed at the vehicle front side of the rockers 72. The front side members 74 extend in the vehicle front-rear direction while sandwiching the FC stack 14 and the power control unit (PCU) that is not illustrated. The rear ends of the front side members 74 are bent so as to protrude toward the vehicle width direction inner side and vehicle rear side, and are connected to the rockers 72.

The pair of left and right rear side members 76 are disposed at the vehicle rear side of the rockers 72. The suspension member 77 is mounted to the rear side members 76. In plan view, the drive motor 12 is disposed between the suspension member 77 and the high pressure canister unit 70. The front ends of the rear side members 76 are bent so as to protrude toward the vehicle width direction inner side and vehicle front side, and are connected to the rockers 72.

Further, under reinforcements 92 that connect the front side members 74 and the rear side members 76 extend in the vehicle front-rear direction. The high pressure canister unit 90 is disposed between the under reinforcements 92 in plan view.

Operation and Effects

Next, explanation follows regarding operation and effects of the third exemplary embodiment.

In the third exemplary embodiment, since the axis direction of the canister bodies 18 is along the vehicle width direction, the length in the axis direction of the canister bodies 18 does not be affected even if the FC stack 14 and the power control unit disposed at the vehicle front side are rearranged to the vehicle rear side. That is, the length in the axis direction of the canister bodies 18 may be maintained in a certain length without depending on sizes of components disposed at the vehicle front or rear section. As a result, flexibility in the design may be increased.

Further, in the third exemplary embodiment the fuel (hydrogen gas) capacity may be increased by stacking the canister bodies 18. Specifically, the canister bodies 18 are stacked using a space below the rear passenger seats, thereby preventing the cabin space to be reduced.

Explanation has been given regarding the high pressure canister unit and the fuel cell vehicle according to the first to third exemplary embodiments. However, various implementations are possible within a range not departing from the spirit of the present disclosure. For example, in the above exemplary embodiment, both axial direction end portions of the canister bodies 18 are coupled together by the tubes 20, 21. However, there is no limitation thereto, and a structure may be configured in which only front end portions of the canister bodies 18 are coupled together by the tube 20. Even in such cases, the plural canister bodies 18 may configure a unit functioning as a single high pressure canister due to placing the interiors of the canister bodies 18 in communication with each other through the tube 20.

Moreover, in the exemplary embodiments described above, each of the canister bodies 18 is configured by the casing body 24, the first reinforcing layer 26, the cap 30, and the second reinforcing layer 28. However, there is no limitation thereto. For example, a structure may be configured in which the canister bodies 18 are not provided with the second reinforcing layers 28, and the case 22 is reinforced to secure shock resistance. Moreover, the materials and fiber orientations of the first reinforcing layer 26 and the second reinforcing layer 28 may be modified as appropriate in accordance with the shock resistance demanded of the canister bodies 18.

Moreover, in the exemplary embodiments described above, the case 22 is configured by the case body 40 and the cover member 42. However, there is no limitation thereto. For example, the case 22 may be configured by the case body 40 alone, without providing the cover member 42. Moreover, a structure may be configured in which the peripheral wall 46 is placed in close contact with the floor panel 16, such that the floor panel 16 functions as a cover member of the case body 40.

Moreover, the arrangement of the canister bodies 18 and the shape of the case 22 are not particularly limited. For example, in the first exemplary embodiment, the canister bodies 18 are arrayed in a single row (stack) in the vehicle width direction. However, a two-stacked configuration may be adopted in which canister bodies 18 are laid over other canister bodies 18.

What is claimed is:

1. A high pressure canister unit comprising:
    a plurality of arrayed canister bodies, each canister body of the plurality of canister bodies being formed in a circular cylinder shape, and including an opening at a first end portion in an axial direction of the respective canister body of the plurality of canister bodies;
    a coupling member connected to the opening of each canister body of the plurality of canister bodies and coupling the plurality of canister bodies, the coupling member forming a flow path that communicates interiors of the plurality of canister bodies;
    a box-shaped case configured to house the plurality of canister bodies and the coupling member, the case including:
        a case body having a bottom wall and a frame-shaped peripheral wall projecting upward from the bottom wall, the peripheral wall surrounding the plurality of canister bodies and including a front wall, a rear wall, a right wall, and a left wall, each one of the front wall, the rear wall, the right wall, and the left wall having a hollow cross-section structure,
        a cover member, and
        a through hole;
    a leader tube disposed on the coupling member, the leader tube extending to an exterior of the case through the through hole, the leader tube being disposed at an intermediate portion of the coupling member in an array direction of the plurality of canister bodies; and
    a valve configured to open and close the flow path to the exterior of the case, the valve being attached to the leader tube.

2. The high pressure canister unit of claim 1, further comprising an attachment bracket disposed on the bottom wall,
    wherein the canister bodies are disposed via the attachment bracket such that the canister bodies do not contact the bottom wall.

3. The high pressure canister unit of claim 1, further comprising a load transmission section having a closed cross-section structure, the load transmission section being disposed on at least one of the bottom wall or the cover member, and the load transmission section spanning between two opposing walls of the peripheral wall.

4. The high pressure canister unit of claim 3, wherein:
    the load transmission section is disposed at a canister body side of the cover member,
    an air passage is formed between the cover member and the load transmission section, and
    the air passage includes a vent that allows a gas to be released to the exterior of the case.

5. A fuel cell vehicle comprising the high pressure canister unit of claim 1, wherein:
    the high pressure canister unit is disposed at a vehicle lower side of a floor panel that configures a floor surface of a vehicle cabin.

6. The fuel cell vehicle of claim 5, wherein the plurality of canister bodies are arrayed in a vehicle width direction and each axis direction of each canister body of the plurality of canister bodies is along a vehicle front-rear direction.

7. The fuel cell vehicle of claim 5, wherein the plurality of canister bodies are arrayed in a vehicle front-rear direction and each axis direction of each canister body of the plurality of canister bodies is along a vehicle width direction.

8. The fuel cell vehicle of claim 7, wherein a subset of canister bodies of the plurality of canister bodies are arrayed at a vehicle rear side of the high pressure canister unit and are stacked in a vehicle vertical direction.

9. The fuel cell vehicle of claim 5, wherein in plan view, vehicle width direction sides of a vehicle rear end portion of the case are indented toward a vehicle front.

10. The high pressure canister unit of claim 1, wherein each one of the front wall, the rear wall, the right wall, and the left wall includes an intermediate wall coupling a plurality of intermediate portions of the hollow cross-section structure in a vehicle front-rear direction, the plurality of intermediate portions extending in a vertical direction.

* * * * *